United States Patent
Aque et al.

(10) Patent No.: US 11,368,227 B2
(45) Date of Patent: Jun. 21, 2022

(54) REFERENCE OPTICAL SIGNAL GENERATOR

(71) Applicant: MACOM Technology Solutions Holdings, Inc., Lowell, MA (US)

(72) Inventors: Richard Aque, Lowell, MA (US); Mitra Tayareh, Lowell, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/111,233

(22) Filed: Dec. 3, 2020

(65) Prior Publication Data

US 2021/0167861 A1    Jun. 3, 2021

Related U.S. Application Data

(60) Provisional application No. 62/943,167, filed on Dec. 3, 2019.

(51) Int. Cl.
*H04B 10/532* (2013.01)
*G02B 5/30* (2006.01)
*H04B 10/50* (2013.01)

(52) U.S. Cl.
CPC ......... *H04B 10/532* (2013.01); *G02B 5/3025* (2013.01); *H04B 10/503* (2013.01); *H04B 2210/006* (2013.01)

(58) Field of Classification Search
None
See application file for complete search history.

(56) References Cited

U.S. PATENT DOCUMENTS

| 5,101,450 | A | * | 3/1992 | Olshansky | H04J 14/0298 385/14 |
| 5,604,757 | A | * | 2/1997 | Liang | H01S 5/042 372/29.012 |
| 6,044,193 | A | * | 3/2000 | Szentesi | G02B 6/4452 385/134 |
| 6,483,620 | B1 | * | 11/2002 | Epworth | H04B 10/2569 398/154 |
| 6,483,624 | B1 | * | 11/2002 | Otani | G02F 1/0121 398/154 |
| 2002/0048062 | A1 | * | 4/2002 | Sakamoto | H04B 10/2569 398/30 |

(Continued)

FOREIGN PATENT DOCUMENTS

| KR | 10-2000-0051885 | 1/2000 |
| KR | 10-2000-0004870 | 8/2000 |

*Primary Examiner* — Darren E Wolf
(74) *Attorney, Agent, or Firm* — Weide & Miller, Ltd.

(57) ABSTRACT

An optic reference signal generator comprising a housing forming an enclosed space with one or more air flow openings. Within the housing is an optic signal generator driver configured to generate an optic signal generator drive signal. An optic signal generator generates an optic signal responsive to the optic signal generator drive signal. A polarity control unit adjusts polarization of the optic signal to create a polarization adjusted optic signal and a modulator bias generator and controller generates a modulation signal. A pattern signal input receives a pattern signal and a modulator receives the polarization adjusted optic signal, the pattern signal, and the modulation signal to generate a modulated output signal.

11 Claims, 6 Drawing Sheets

(56) References Cited

U.S. PATENT DOCUMENTS

| | | | | |
|---|---|---|---|---|
| 2004/0033004 | A1* | 2/2004 | Welch | B82Y 20/00 |
| | | | | 385/14 |
| 2008/0239668 | A1* | 10/2008 | Hendrix | H05K 7/20563 |
| | | | | 361/695 |
| 2011/0013907 | A1* | 1/2011 | Sugihara | H04B 10/50575 |
| | | | | 398/38 |
| 2016/0223844 | A1* | 8/2016 | Ichikawa | G02F 1/035 |
| 2017/0288770 | A1 | 10/2017 | Mentovich et al. | |
| 2017/0331559 | A1 | 11/2017 | Matsushita et al. | |
| 2018/0269645 | A1 | 9/2018 | Cannon et al. | |
| 2020/0153509 | A1* | 5/2020 | Chen | H04J 14/06 |

* cited by examiner

REFERENCE OPTICAL SIGNAL GENERATOR

FIELD OF THE INVENTION

The invention relates electrical to optical converter and in particular, to a method and apparatus for generating a stable reference quality optical signal.

RELATED ART

During design and testing of optical components and system it is beneficial to have a stable optic signal that does not vary over time or location in the lab. This allows for accurate design and testing of optical communication devices and system without unwanted variation in the reference optical signal.

A number of different and separate prior art devices have been proposed which may be electrically and optically connected to generate an optic signal having particular characteristics, but this arrangement of separate prior art devices suffer from several drawbacks.

One such drawback is that the prior art arrangements did not maintain optical polarization or allow means to adjust polarization. Failure to maintain consistent optical polarization over time leads to an unstable optical test signal.

In addition, the prior art required a group of individual components typically arranged in proximity on a test bench. Each item was a separate self-contained component and as such, the arrangement of each element from test to test would vary. This leads to several drawbacks. One such drawback is that there was no temperature consistence between elements, and the prior art elements did not contain a cooling system or a unified cooling system. Further, the diversity of location of each separate element leads to wide range of temperature variations for each element. One may be near a window while another may be under an AC vent. Further, each separate and free-standing item of equipment that was connected by optic cable was subject to movement and the exposed optic cables that interconnected the components are also subject to movement or disruption. All these events reduce stability of the optic test signal.

To overcome the drawbacks of the prior art and provide additional benefits an optic reference signal generator and control system is disclosed.

SUMMARY

In one embodiment the optic reference signal generator comprises a housing, which forms an enclosed space with one or more air flow openings. Within the housing is an optic signal generator driver. The optic signal generator driver is configured to generate an optic signal generator drive signal. An optic signal generator is provided and configured to generate an optic signal responsive to the optic signal generator drive signal. A polarity control unit is configured to receive the optic signal and adjust polarization of the optic signal to create a polarization adjusted optic signal. A bias signal generator and controller to generate a bias signal while a pattern signal input is configured to receive a pattern signal. The modulator is configured to receive the polarization adjusted optic signal, the pattern signal, and the modulation signal to generate a modulated output signal.

In one embodiment, the system may further comprise an external optic signal port configured to receive an optic signal from an external source. Similarly, one or more external optic signal generator control signal ports may be provided and configured to receive one or more optic signal generator control signal from an external source. In one configuration the system may further comprise an external bias signal source port configured to receive a bias signal from an external source.

The signal generator may also include an amplifier configured to receive and amplify the pattern signal, based on an amplifier control signal, to create an amplified pattern signal, such that the amplified pattern signal is provided to the modulator in place of the pattern signal. The optic signal, polarization adjusted optic signal, and modulated optic signal are carried over fiber optic cables within the housing and one or more fiber optic cable stays secure at least one of the fiber optic cables in place to maintain optic signal consistency. Also part of this exemplary system is one or more temperature monitors and one or more fans configured to maintain a temperature within the enclosing area with a temperature range.

Also disclosed is a method for generating a reference optic signal. This method occurs in a reference signal generator having a housing and forming an interior area that contains and protects and optic signal generator driver, an optic signal generator, a polarity control unit, a modulator bias generator and controller, a pattern signal input, and a modulator. As part of this method, the user or reference signal generator sets one or more optic signal generator control parameters and based on these parameters an optic signal is generated with the optic signal generator. Then, the user may adjust the polarity of the optic signal to create a polarization adjusted optic signal. At the modulator, the polarization adjusted optic signal, a bias voltage and a modulation signal are received, and the modulator modulates the polarization adjusted optic signal based on the bias voltage and the modulation signal to create a modulated optic signal. The modulated optic signal is output as the reference optic signal. Conducting the optic signal, the polarization adjusted optic signal, and the modulated optic signal between devices within the reference signal generator occurs over fiber optic cables and at least one of the fiber optic cables are secured with cable stays to inhibit movement of the at least one of the fiber optic cables. The optic signal generator controller may be external to the housing.

In one embodiment, this method further comprises receiving the bias voltage from a bias voltage generator that is external to the housing. It is contemplated that this method may further comprise monitoring a temperature within the housing with one or more temperature monitors and activating and deactivating one or more fans based on the monitoring. The step of generating an optic signal with the optic signal generator may be performed by an optic signal generator that is external to the housing and the optic signal is input to the reference signal generator through an optic signal input port. This method may further include adjusting the bias voltage using a using adjustable bias controller that accessible on the outside of the controller.

Also disclosed is a reference signal generator configured to generate a reference optic signal. In one embodiment, the optic signal generator is configured to generate an optic signal responsive to one or more optic signal generator control signals and a user adjustable polarity control unit is configured to receive the optic signal and adjust polarization of the optic signal to create a polarization adjusted optic signal. A modulator is configured to receive and process the polarization adjusted optic signal, a pattern signal, and a bias signal to generate the reference optic signal. One or more fiber optic cable stays are part of the reference signal generator and configured to secure one or more fiber optics cables that are part of the reference signal generator to inhibit or prevent movement of the fiber optic cables which would disrupt the polarization setting. Also part of this system is one or more temperature monitors configured to monitor a temperature of the reference signal generator and responsive to the temperature being greater than a predetermined temperature, activating a cooling device, such as but not limited to a fan.

In one embodiment, the reference signal generator further comprises a selector switch to select whether the one or more optic signal control signals used by the optic signal generator are generated within the reference signal generator or an external optic signal generator control signal generator. The reference signal generator may further comprise a selector switch to select whether the bias signal provided to the modulator is generated by the reference signal generator or a bias signal generator that is external to the reference signal generator. The pattern signal may be radio frequency signal selected to modulate the polarization adjusted optic signal and the pattern signal is generated external to the reference signal generator.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks of the prior art and provide additional benefits, disclosed is a stable optical reference transmitter (generator) for NRZ and PAM4. In one embodiment, the transmitter operates in the O-band but in other embodiments other bands are contemplated. Based on the configuration described below, the drawbacks of the prior art are overcome, and additional benefits provided.

Figure 1:
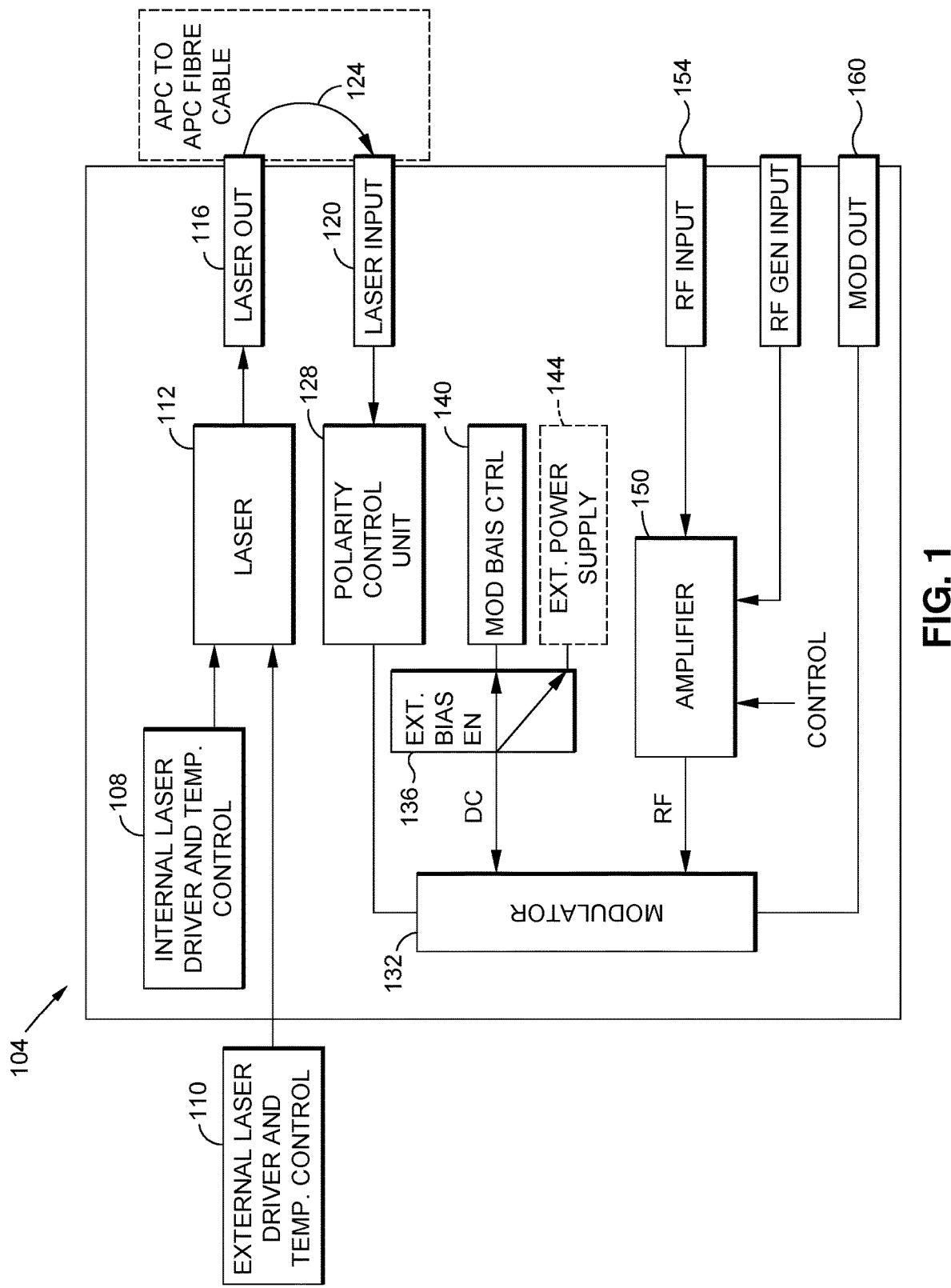
FIG. 1 is a block diagram of an example embodiment of a reference optical signal generator.

FIG. 1 illustrates a block diagram of a stable optical reference transmitter capable of generating a reference quality optical signal used for design and testing of optical communication equipment or optic systems. The disclosed system outputs an optic signal that does not vary or drift over time from the intended or desired signal. In addition, the system avoids disturbance of the optic signal by securing the optic cable and components to which they attached by cable stays or any other attachment mechanism. This also maintains optical alignment and polarization. Polarization control systems are in place to adjust and optimize polarization, which is maintained through use of the cable stays. The disclosed system also includes temperature monitoring and control which maintains all system elements at a generally uniform temperature. A full or partial housing or other protective cover may create an enclosed space in which numerous optic, electrical, and control components are located.

As shown in FIG. 1, the optical reference transmitter system 104 includes a laser driver 108 which provides a controlled drive signal to a laser 112. The laser driver 108 may be any type of amplifier, driver or other elements configured to activate the laser 112 to generate an optic signal. Laser drivers are generally known, and as such are not described in detail. Also provided is a connector for connection of an external laser driver controller 110 that may be selective attached to the laser 112 to provide for optional external control over the laser. The laser 112 is described as a laser for purposes of discussion may be may considered or referred to as an optic signal generator, such as but not limited to a laser, LED, or any other light source. The output from the laser 112 is an optic signal.

The optic signal from the laser 112 is provided to an optional laser output port 116 or it may be provided directly to a polarity control unit 112. If provided to the output port, it may be looped back to the laser input port 120 using an external optic cable 124 to connect the laser output port 116 and the laser input port 120. The laser input port 120 is provided so that an external laser (not shown) may connect to the laser input port 120 such that the external laser may be the source of the optic signal in the event that a different type or power laser is preferred when generating the reference optic signal. For example, a user may wish to use a laser having a different power level, different frequency, or some other aspect, the laser input port 120 will accept such an input. In addition, if the laser 112 is functioning, a secondary laser may be connected to input 120 to create a blended or combined optic signal.

The optic signal from the laser input 120 is provided to a polarity control unit 128. The polarity control unit 128 is configured to allow a user to adjust the polarity of the optic signal. Polarity control units are available from KS Photonics. As discussed below, the polarity control unit 128 may have one or more user inputs configured to accept input from a user, or the polarity control may occur automatically. The output of the polarity control unit 128 is provided to a modulator 132. The modulator 132 introduced modulations to the optic signal to create a modulated signal based on a desired frequency, input signal or input pattern, and one or more bias signals.

To enable operation of the modulator 132, the modulator receives a bias voltage and a radio frequency (RF) input signal, referred to herein as a pattern signal. Modulator operation is generally understood in the art and as such is not described in detail. An exemplary source for an optic modulator is EOSpace.com. In general, and in this embodiment, the optic modulator 132 receive the optic signal from the laser 112 as well as a bias voltage and a pattern signal, use for testing purposes, which takes the place of a data signal. A bias voltage source and controller 40 is provided to generate and adjust (with user or automated input) a bias voltage. A bias voltage port 144 is also provided to allow for connection to an external power supply to provide an external bias voltage. Thus, the system is not limited to the bias voltage source and controller located within the housing. A switch 136 or other selector device connects to the modulation voltage source and the external bias voltage port 144 to provide user control over which element (source 140 or external source via port 144) is provided to the modulator 132. The bias voltage source and controller 140 may comprise any type device capable of generating a DC bias voltage from 1.25V to 7.5V range to optimize the output laser power.

A pattern generator 154, as referred to as an RF signal source, is provided to generate and provide a RF signal to the modulator 132. The RF signal may be any type signal such as a pattern signal simulating data. In one embodiment, the RF input 154 is a port configured to receive an RF signal from an external source thus allowing a wide variety of different type signals to be input into the modulator to function as a modulating signal. The RF input 154 provides flexibility for the user to allow use of any number of external RF signal generators. An amplifier 150 receives the pattern signal provided on the RF input and amplifies the pattern signal prior to the pattern signal being provided to the modulator 132. The amplifier 150 power level may be controlled by the user or fixed. Control may occur with a knob controlled by the external signal generator. Any type amplifier may be used to increase the power level of the received signal.

The modulator 132 generates a modulated optic signal based on the bias voltage input and the amplified pattern signal, which may be RF signal to function as an appropriate test signal. The resulting modulated optic signal is output on the output port 160.

As discussed below, it is contemplated that the system shown in FIG. 1 may be contained in a housing that protects the elements and provides a uniform cooling mechanism to maintain generally content temperature within the housing. The housing will have one or more air flow openings and a fan to enable air flow for cooling. Additional openings may be provided in the housing to accept the input ports, output ports, control inputs/outputs, and information providing components as discussed below. This is but one possible embodiment of the internal components and external inputs/outputs for the optic signal generation unit as described. It is contemplated that other embodiments and configurations are possible.

Figure 2:
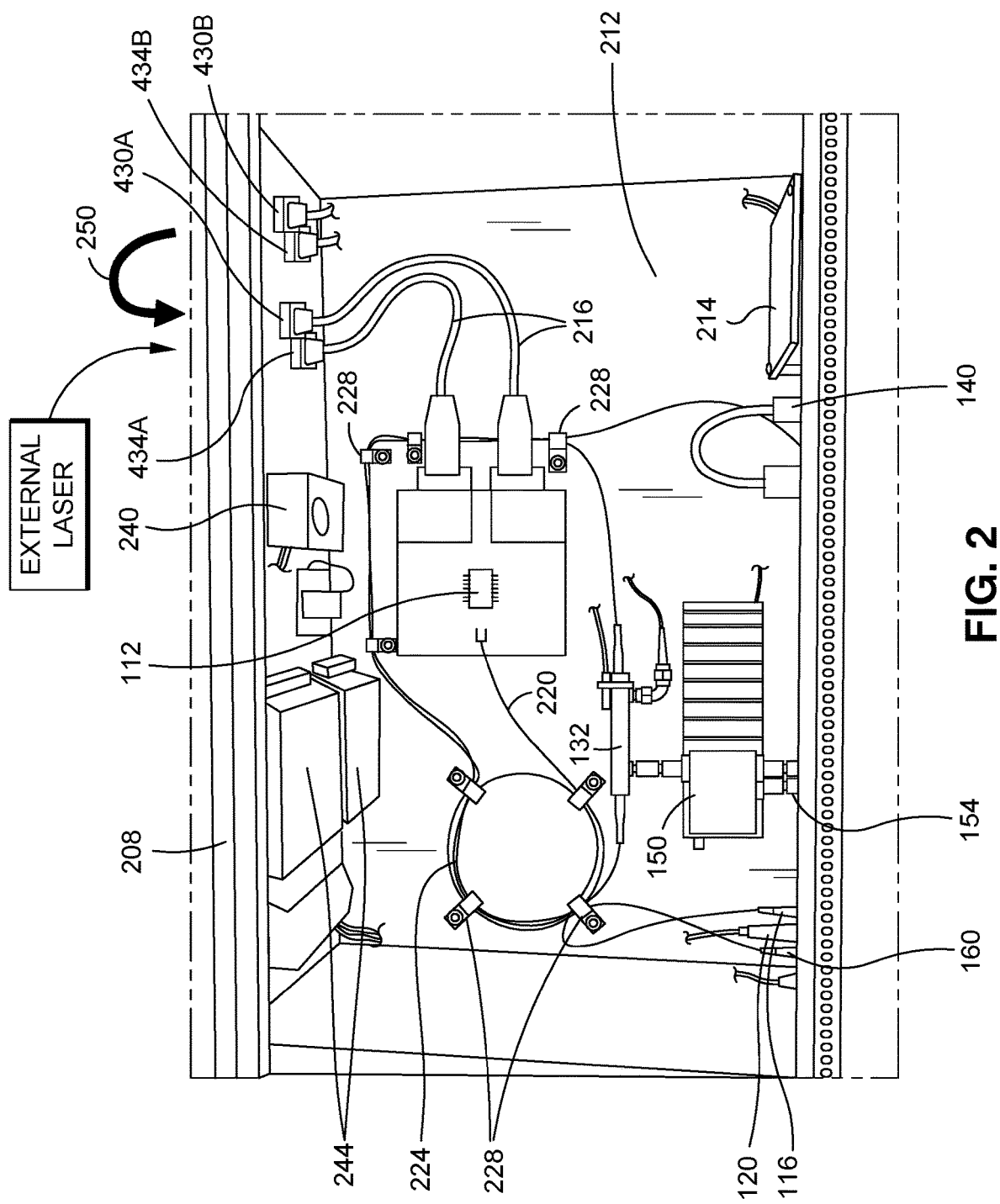
FIG. 2 is an internal view of an exemplary reference optical signal generator.

FIG. 2 illustrates an exemplary component layout in an internal area of a housing. The housing 208 forms an internal area 212 which houses the components of FIG. 1. The laser 112 is centrally located as shown. Laser control signals are provided on cables 216 to the laser 112 from a laser power and temperature controller 214 (element 108 in FIG. 1). The control signals from the laser power and temperature controller 214 are provided to output ports 430B, 434B. One or more loop back connectors 250 connect to the output ports 430B, 434B and the input ports 430A, 434A to route the control signals back into the housing 208 and to the laser 112. If an external laser power and temperature controller 214 were to be connected, it would connect directly to inputs 430A, 434A to provide the external control signals to the laser 112 and the internal laser power and temperature controller 214 would be disabled.

The laser 112 generates an optic signal which is provided on fiber optic cables 224 to an optic signal output port 116. The fiber optic cable is secured by one or more cable stays 228 or binders. The stays 228 may comprise any type securing device configured to maintain the optic cables 224 in place thereby preventing movement which would disrupt consistent operation. The cable stays 228 may be located throughout the housing to secure the fiber optic cables 224, which conduct the optic signals, from element to element.

Figure 3:
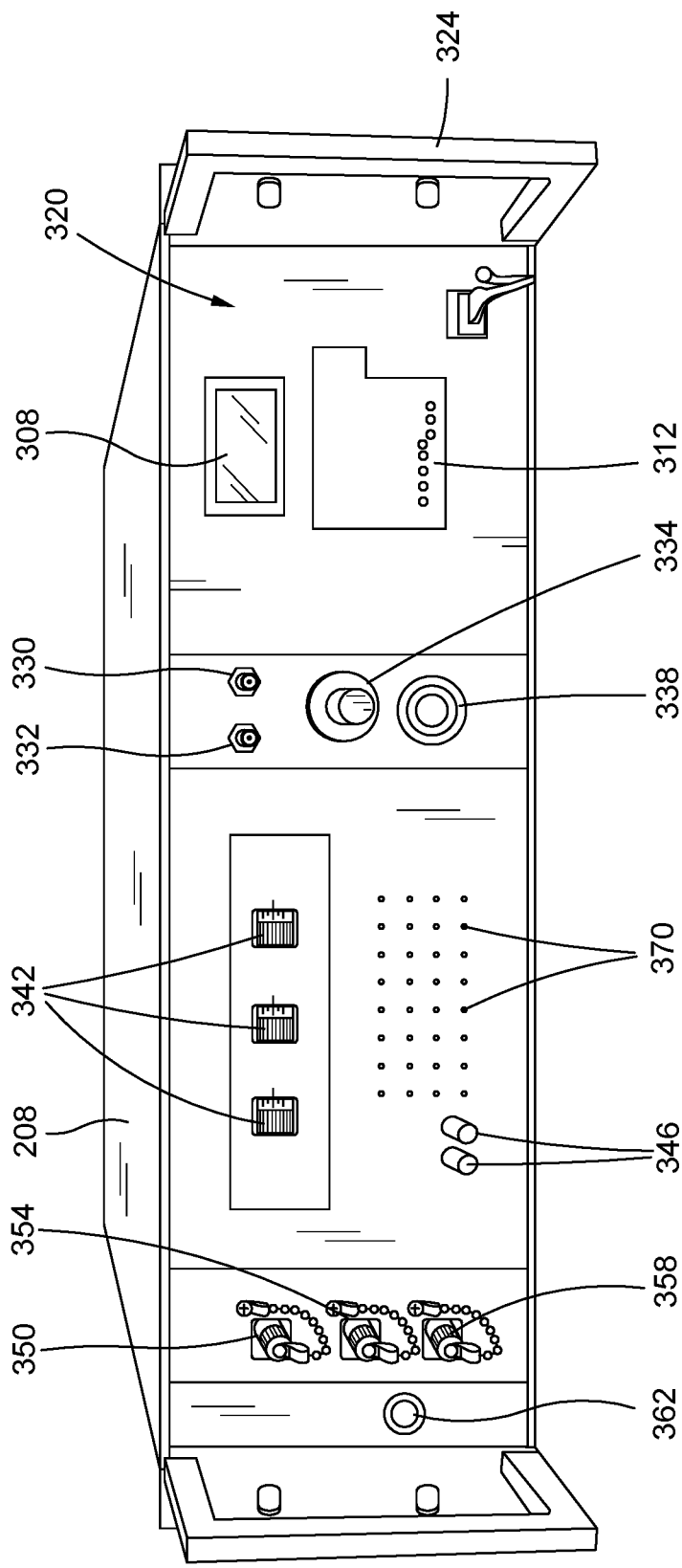
FIG. 3 is an exemplary front panel of the reference optical signal generator.

The optic signal from the laser 112 is provided to a modulator 132 or may also be provided to a laser output port 116 on the front of the housing. In this embodiment, the optic signal is provided to the laser output port 116, which is provided on the front of the housing, which is shown in FIG. 3. As discussed in greater detail in FIG. 3, an optic loop back cable may connect the laser output port to a laser input port 120 to route the laser generated optic signal back into the housing and to the polarity control unit (not shown in FIG. 2, but shown in FIGS. 1 and 3). Alternatively, an external laser (optic signal generator) may be connected to the laser output port to utilize an externally generated optic signal. In such case, the external laser would connect to external laser port 120 and the internal laser would be disabled.

The optic signal (whether from the internal laser 112 or an external source) feeds into an optic modulator 132. The optic modulator also receives a bias voltage, from bias voltage generator and controller 140, and a pattern signal, which may be an RF signal from an external source received over pattern signal input port 154. The pattern signal is provided to an optional amplifier 150 that is configured to generate an amplified pattern signal (RF signal). A user adjustable controller is provided to control the amount of amplification to the pattern signal prior to being sent to the modulator. The amplified pattern signal is provided to the modulator 132 to modulate the optic signal. The output of the modulator 132 is the reference optic signal and is provided on a modulated optic signal output 160.

The housing 208 includes one or more fans 240 that is controlled by a temperature-based controller. One or more temperature monitors may be located in the housing to monitor the temperature in the housing or one or more elements in the housing. The fan 240 or multiple fans, may be any size or configuration to maintain a generally constant temperature in the housing interior or for a particular heat generating element. One or more fans 240 may also be placed in the housing to direct air flow at specific components. Power is provided from a power supply 244 and distributed to one or more of the elements within the housing.

FIG. 3 illustrates a front view of the housing of the reference signal generator shown in FIG. 2. This is but one possible front panel 320 layout, and one of ordinary skill in the art may arrive at other layouts without departing from the innovation's scope. The housing 208 has a front panel 320 to which the various elements described below. The housing 208 may include handles 324 as shown with mounting holes to allow for rack mounting or for bench top use. Air ventilation openings 370 may also be provided to enhance cooling.

In this embodiment, a temperature display 308 provides visual information regarding the temperature inside the housing 208 or at one or more locations within the housing, such as the temperature of certain elements. More than one display may be provided to convey different temperatures at different locations or for different elements, or a single display may show multiple temperatures. Alarms may be provided to alert the user of temperature changes. Located below the temperature display 308 to monitor the ambient temperature inside the housing. The temperature display 308 may connect to a temperature monitor which detects the temperature.

Moving to the left on the front panel 320 is bias monitoring output port 330 for externally monitoring the DC bias voltage. This output port 330 may connect to a monitoring scope or meter to monitor the bias voltage. Bias voltage input port 332 allows for connection of an external bias voltage source provided to allow for higher than the limit voltage provided by the onboard modulation bias voltage generator and control. Bias voltage input port 332 allows the reference signal generator to accept externally generated DC supply voltage sources thus providing flexibility of operation with any number of external bias voltage sources. Below the input 330 is a bias controller 334 that may be adjusted by the user to increase or decrease the bias voltage.

In one embodiment the bias controller 334 is a rotatable knob. Below the bias controller 334 is an external bias signal enable and disable button (switch) 338. This button 338 determines whether the system uses the internal bias signal or an externally provided bias signal. The button 338 corresponds to element 136 in FIG. 1.

Moving to the left from the inputs 330, 332 is a polarization controller 342 with one or more user adjustable inputs (rotary dials) that allow the user to adjust and make optimal the polarization of the optic signal. Below the polarization controller 342 are RF inputs 346 configured to accept external radio frequency input signals, such as the pattern signal as from an external source. Two inputs 342 are provided to accept a differential format signal. This allows flexibility for the user to connect any external RF signal (pattern signal) source. Due to the size of the housing, it is contemplated that additional equipment may be located in the interior of the housing, such as a radio frequency signal source, if so desired.

Moving to the left of the polarization controller 342 are several inputs and outputs. The bottom output is a modulated optic signal output port 358, also referred to as the reference signal output. The modulated optic signal output port 358 provides the reference signal that is provided to the device under test, i.e., the optical output of the system.

Above the optic signal output port 358 is an optic signal input 354 and optic signal output port 350. The optic signal output port 350 provides the optic signal form the internal laser (optic signal generator). The optic signal input port 354 is configured to accept an optic signal from an external laser (optic signal generator). These two inputs/outputs 350, 354 may be connected by a loop cable to redirect the optic signal from the internal laser back into the reference signal generator to the polarity control unit. A power button 362 is provided to the left of the connector 358 to power on and off the reference signal generator.

Figure 4:
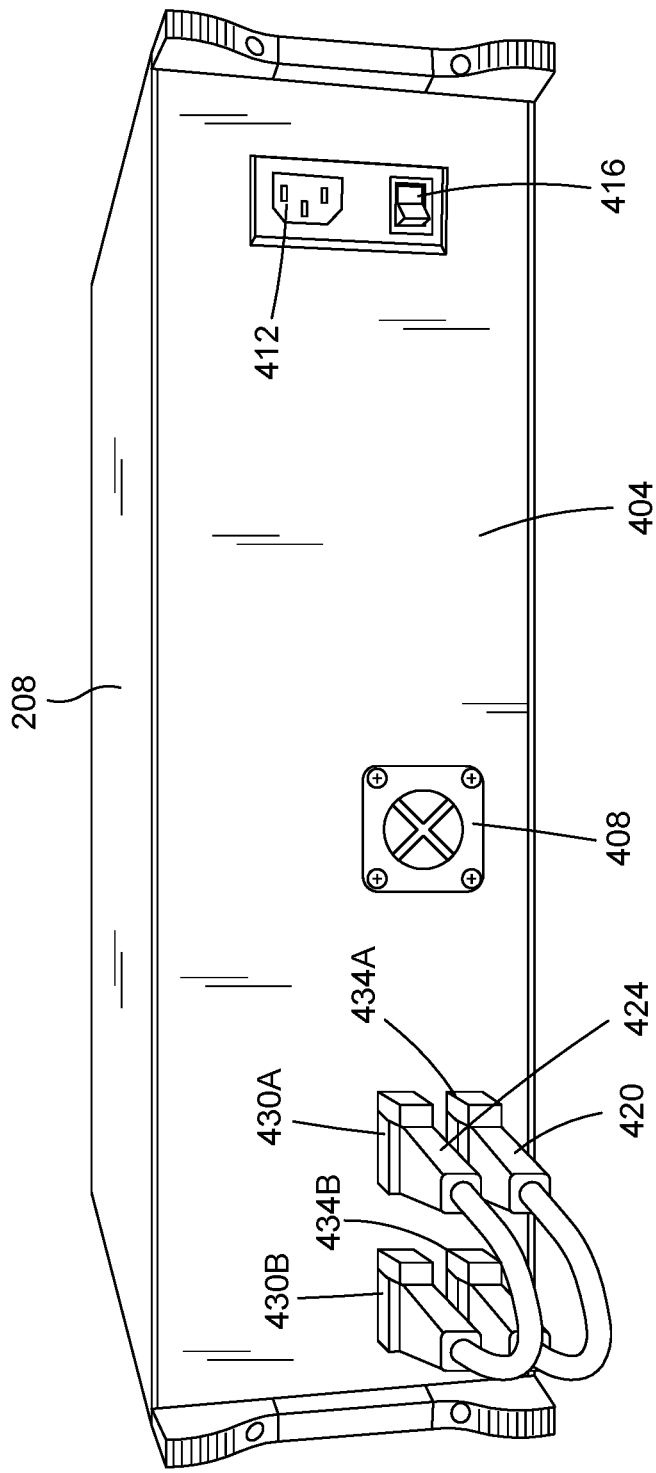
FIG. 4 is an exemplary back panel view of the reference optical signal generator.

FIG. 4 is an exemplary back panel view of the reference optical signal generator. This is but one possible arrangement. Shown in FIG. 4 is the housing 208 which has a back cover 404. Visible on the back cover 404 is fan 408 and power input port 412 for traditional AC 110V power with associated external power switch 416. Other power types or connection types are contemplated. Although shows with one fan 408 it is contemplated that any number of fans may be placed at openings in the housing 208 and that internal fans may be located near specific heat generating elements. In addition, heating or cooling equipment, such as heaters or air conditioners may be used to closely maintain a desired temperature over long test runs if room temperature varies beyond a desired range.

Also shown on the back cover 404 is a laser driver controller loopback 420 and a laser temperature controller loop back 424. The laser temperature controller loop back 424 connects to laser temperature control input and output ports 430, 434. The laser driver controller loop back 424 connects to a laser driver controller input and output ports 433. The input ports 430A, 434A provide a connection point for an external laser driver controller and an external laser temperature controller to be connected in situations where the user elects to not use the internal laser driver controller and an internal laser temperature controller.

Figure 5A:
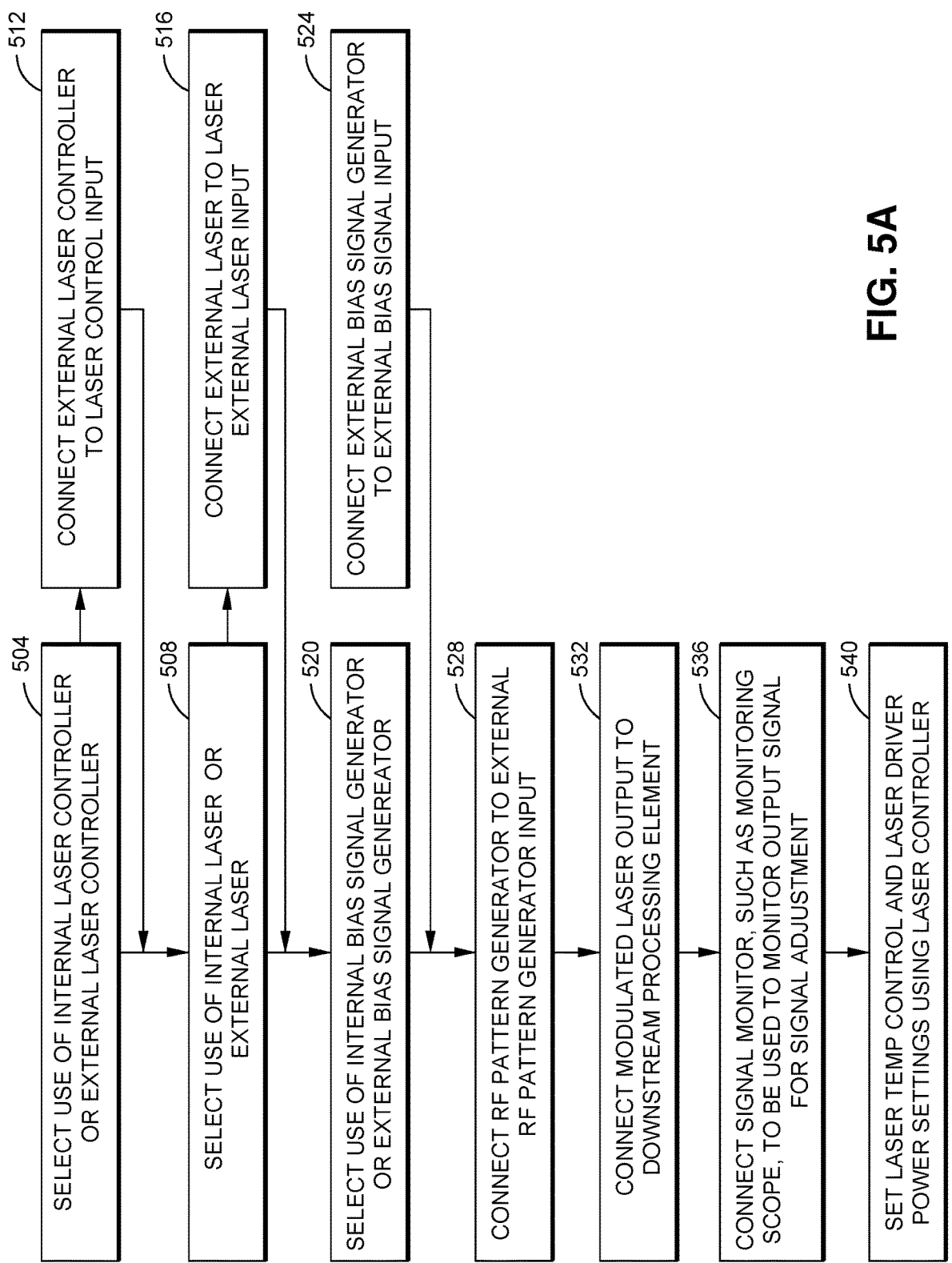
FIG. 5A and FIG. 5B are an operational flow diagram of an example method of operation.

FIG. 5A is an operational flow diagram of an example method of operation. This is but one possible method of operation and as such it is contemplated that other methods of operation are possible. It is understood that the system described above is provided to generate a reference signal. As part of this method a decision or selection is made, at a step 504 whether to use the internal laser controller of the reference signal generator or use an external laser controller. As discussed above, the reference signal generator has a laser controller built in, or an external laser controller may be connected to external connection ports. If the internal laser controller is to be used, then the operation advances to step 508 or, if an external laser controller is to be used, then the operation advances to a step 512 and the user connects the external laser controller to the laser control input.

At a step 508, a decision and selection are made to use the internal laser, that is internal to the reference signal generator or to use an external laser to generate the optic signal. If the internal laser is to be used, then the operation advances to step 520. If the selection is made to use an external laser, then at a step 516 the external laser is connected to the external laser input port of reference signal generator. After step 516 the operation advances to step 520.

At a step 520, a selection or decision is made to use the internal bias signal generator or an external bias signal generator. If the internal bias signal generator is selected for use, then the operation advances to step 528. Alternatively, if an external bias signal generator is elected for use, then the operation advances to step 524. At step 524 the external bias signal generator is connected to the external bias signal input. After step 524 the operation advances to step 528.

At a step 528 a radio frequency (RF) or any type pattern generator is connected to the external pattern generator input port of the reference signal generator. This allows any pattern generator capable of producing any type signal pattern to be input to the reference signal generator. At a step 532, an output of the reference signal generator is connected to a downstream processing element. In this configuration the output of the reference signal generator is a modulated laser output.

It is also contemplated, that at a step 536, a signal monitor, such as an oscilloscope, is connected to an output port or a monitoring port of the reference signal generator to view, analyze, and monitor the modulated optic signal output from the reference signal generator. Viewing, analyzing, and monitoring the modulated optic signal allows monitoring of adjustments to the signal to verify the adjustment establish the signal with the desired parameters of the specified reference signal. Any type monitoring may occur using any type signal monitoring device.

At a step 540, a user sets the desired laser temperature control and laser driver power levels using the laser controller, which may be the internal controller or an external controller. Other laser settings may be established by the controller.

Figure 5B:
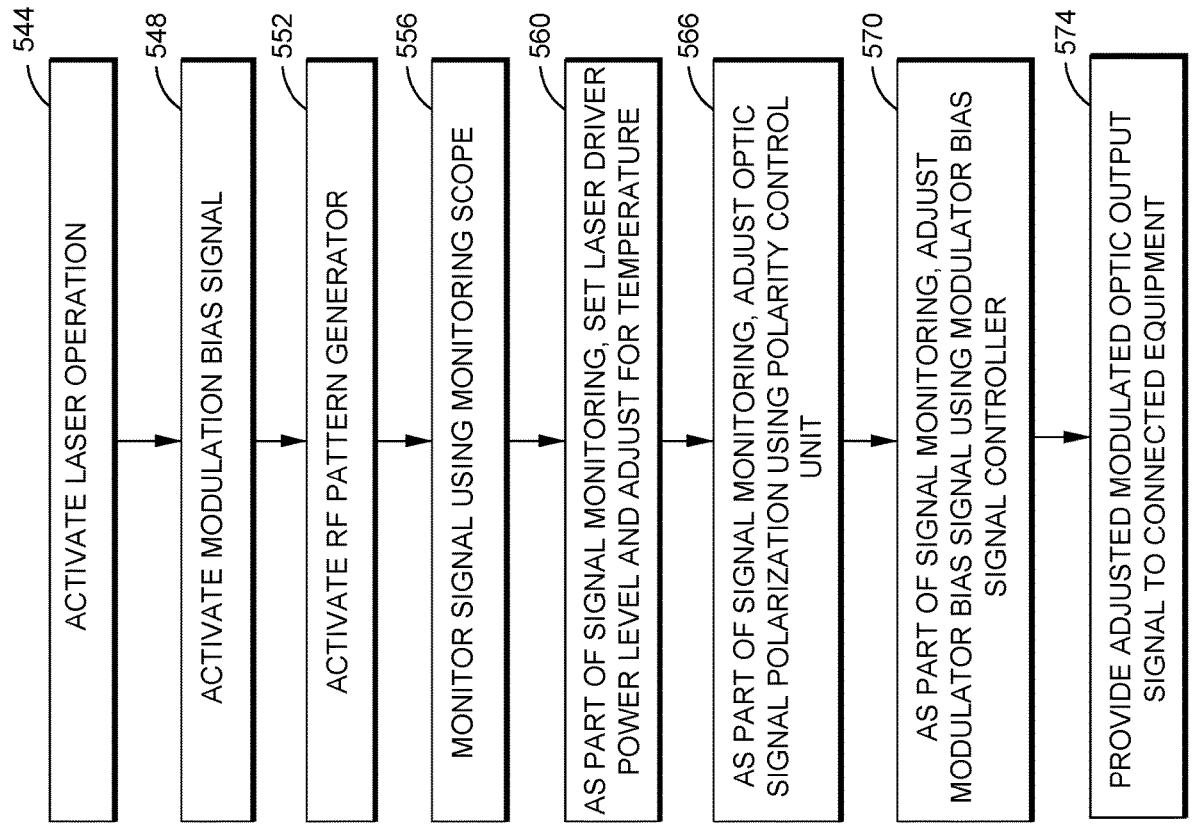

Turning to FIG. 5B, at a step 544 the user activates the laser operation, at a step 548 activates the modulation bias signal generator, and at a step 552 activates the pattern generator. Step 544, 548 552 may be implemented in any order or at a different stage of system operation. Once the primary elements are activated, at a step 556 monitoring of the modulated optic signal may occur using the monitoring scope.

At a step 560, as part of the signal monitoring the laser driver power level and operating temperature parameters may be set or adjusted. Likewise, at a step 566 as part of the signal monitoring, the user may adjust the optic signal polarization using the polarity control unit provided on the front of the reference signal generator as shown in FIG. 3. At a step 570, as part of the signal monitoring, the modular bias signal may be adjusted using the modulator bias signal controller. This may occur by rotating the knob on the front panel while monitoring the signal to set the desired modulator bias level. At a step 574, the adjusted and desired reference signal, in the form of a modulated optic output signal is provided to downstream elements, which processes the reference optic signal, such as for testing and performance evaluation of the downstream elements.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

The invention claimed is:

1. An optic reference signal generator comprising:
a housing forming an enclosed space with one or more air flow openings;
an optic signal generator driver within the enclosed space, the optic signal generator driver configured to generate an optic signal generator drive signal;
an optic signal generator configured to generate an optic signal responsive to the optic signal generator drive signal;
a user adjustable polarity control unit configured to receive the optic signal and adjust polarization of the optic signal to create a polarization adjusted optic signal;
a bias signal generator and controller, connected to a modulator, configured to generate a bias signal which is provided to the modulator;
a pattern signal input configured to receive a pattern signal from an external source;
an amplifier configured to receive the pattern signal and provided an amplified pattern signal to the modulator; and
the modulator configured to receive the polarization adjusted optic signal, the pattern signal, and the bias signal to modulate the polarization adjusted optic signal to generate a modulated output signal.

2. The signal generator of claim 1 further comprising an external optic signal port, connected to the polarity control unit, configured to receive an optic signal from an external source, to thereby bypass the optic signal generator in the housing.

3. The signal generator of claim 1 further comprising one or more external optic signal generator control signal port configured to receive one or more optic signal generator control signals from an external source, and provide the one or more optic signal generator control signals to the optic signal generator to thereby bypass the optic signal generator driver.

4. The signal generator of claim 1 further comprising an external bias signal source port, connected to the modulator, configured to receive an external a bias signal from an external source, to bias the modulator.

5. The signal generator of claim 1 further comprising an amplifier configured to receive and amplify the pattern signal, based on an amplifier control signal, to create an amplified pattern signal, such that the amplified pattern signal is provided to the modulator in place of the pattern signal.

6. The signal generator of claim 1 wherein the optic signal, polarization adjusted optic signal, and modulated optic signal are carried over fiber optic cables within the housing and one or more fiber optic cable stays secure at least one of the fiber optic cables in place to maintain optic signal consistency.

7. The signal generator of claim 1 further comprising one or more temperature monitors and one or more fans configured to maintain a temperature within the enclosing space within a temperature range.

8. A reference signal generator configured to generate a reference optic signal comprising:
an optic signal generator configured to generate an optic signal responsive to one or more optic signal generator control signals;
a user adjustable polarity control unit configured to receive the optic signal and adjust polarization of the optic signal or an externally generated optic to create a polarization adjusted optic signal;
an optic signal input port, connected to the polarity control unit, configured to receive the externally generated optic signal and present the externally generated optic signal to the polarity control unit;
a modulator configured to receive and process the polarization adjusted optic signal, a pattern signal, and a bias signal to generate the reference optic signal;
one or more fiber optic cable stays configured to secure one or more fiber optics cables that are part of the reference signal generator; and
one or more temperature monitors configured to monitor a temperature of the reference signal generator and responsive to the temperature being greater than a predetermined temperature, activating a cooling device.

9. The reference signal generator of claim 8 further comprising a user movable selector switch to select whether the one or more optic signal generator control signals received and used by the optic signal generator are generated by an internal optic signal generator control signal generator or an external optic signal generator control signal generator.

10. The reference signal generator of claim 8 further comprising a selector switch to select whether the bias signal provided to the modulator is generated by the reference signal generator or a bias signal generator that is external to the reference signal generator.

11. The reference signal generator of claim 8 further comprising an amplifier, having an output connected to the modulator, the amplifier configured to receive the pattern signal, and the pattern signal is a radio frequency signal generated external to the reference signal generator.

* * * * *